INVENTORS
Eugene P. Thomas, Robert L. Guentner
& Everett W. Vaughn.

United States Patent Office 3,099,747
Patented July 30, 1963

3,099,747
X-RAY APPARATUS WITH AUTOMATIC SHUTTER CONTROL MEANS
Eugene P. Thomas and Robert L. Guentner, Catonsville, and Everett W. Vaughn, Ellicott City, Md., assignors to Westinghouse Electric Corporation, East Pittsburgh, Pa., a corporation of Pennsylvania
Filed Apr. 7, 1960, Ser. No. 20,711
2 Claims. (Cl. 250—105)

This invention relates to X-ray apparatus and more particularly to X-ray apparatus of the type including a source of X-rays which are defined as an X-ray beam by operator-controlled variable collimator means, such as X-ray shutter means, for transmission through an object and projection onto a flat image producing member, such as a film, or screen, to produce an image of the internal structure of such object, and in which X-ray apparatus relative positioning of one or more of the several components tends to affect dimensions of the beam area intercepted by the image producing member independently of preselected adjustment of the variable collimator means.

In an X-ray apparatus of the above type, it is desirable to maintain the dimensions of the X-ray beam area intercepted by the image producing member in accord with preselected adjustment of the variable collimator means, and heretofore any relative positioning of the several previously identified components required the operator to readjust the variable collimator means. This readjustment on the part of the operator is time-consuming, while failure to make such adjustment at the appropriate time results in such as excessive stray radiation, as where the X-ray beam might extend beyond the domain of the image producing member, for example.

In view of the foregoing remarks, it becomes a prime object of the present invention to provide an X-ray apparatus of the identified type, which overcomes the referred-to objections.

It becomes another object of this invention to provide an X-ray apparatus of the identified type in which dimensions of the X-ray beam area as intercepted by the image producing member are automatically maintained a preselected size irrespective of changes in relative positions of one or more of the aforementioned several components tending to alter such size.

Figure 1:
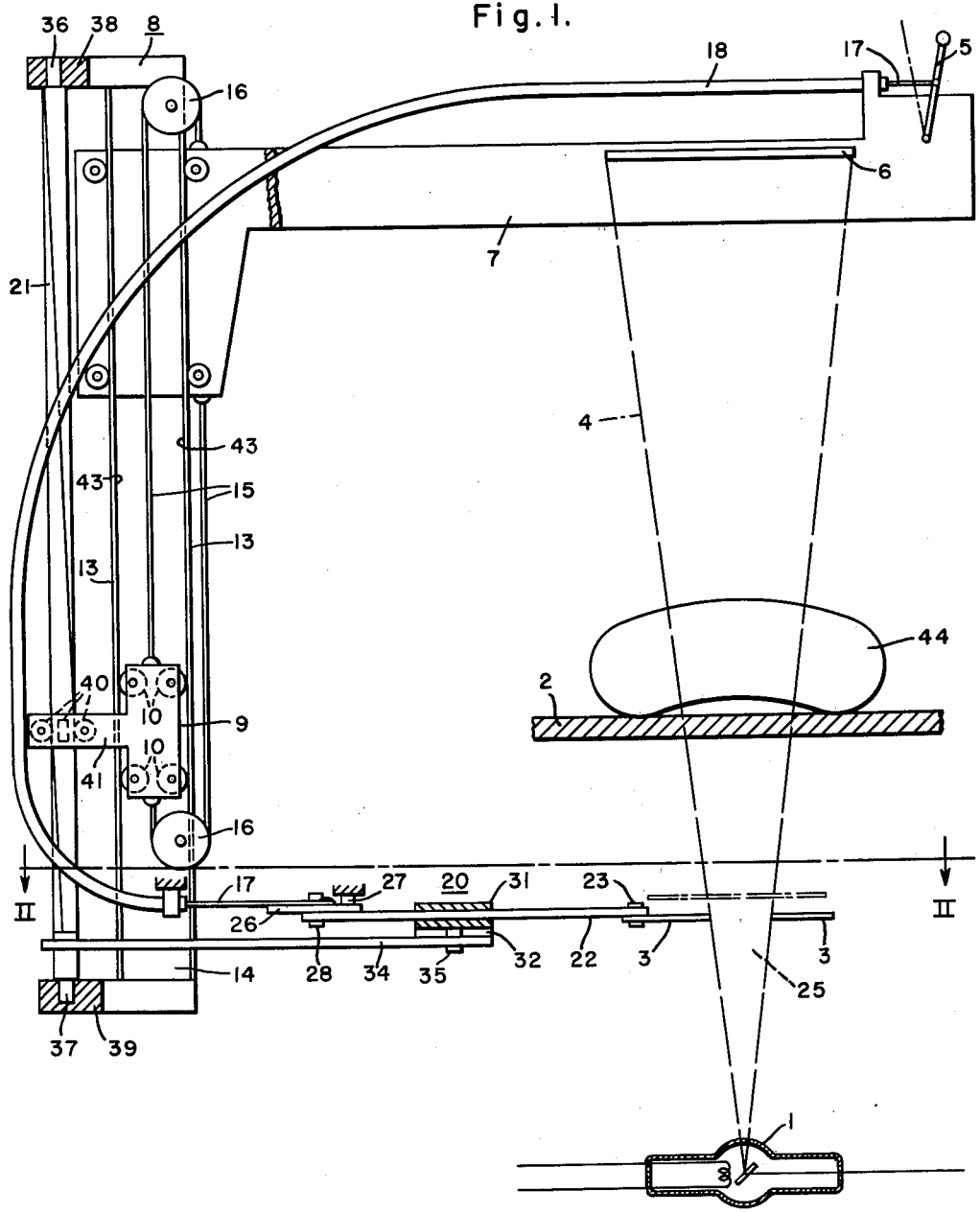
Figure 2:
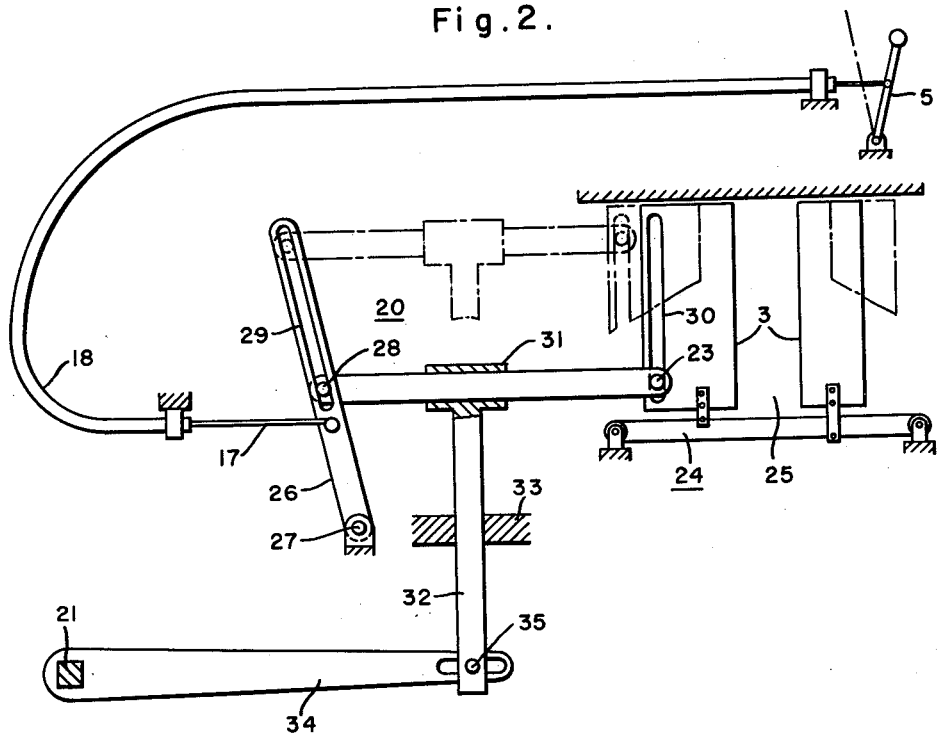

Other objects and advantages of the invention will become apparent from the following description, taken in connection with the accompanying drawing in which:

FIGURE 1 is a schematic showing of the X-ray apparatus embodying the invention; and, FIG. 2 is a view of a portion of such apparatus taken along the line II—II in FIG. 1.

*Description*

For sake of exemplification, the embodiment of the invention shown in the drawings, takes the general form of an X-ray apparatus which comprises an X-ray source, X-ray tube 1, which may be mounted inside an X-ray table (not shown in total) for disposition a fixed distance away from the X-ray table top 2; variable collimator means, a pair of X-ray shutters 3 disposed beneath the table top 2 to define a beam 4 of X-rays emanating from the X-ray tube 1; an operator's collimator control member, a shutter control handle 5, operatively connected to the shutters 3 to select a desired dimension of the X-ray beam 4; and an image producing member 6, which may be a sheet of film, a fluorescent screen, or the input screen of an image amplifier, for example, which intercepts the X-ray beam 4 and, in being mounted on a horizontally-projecting portion of a vertical carriage means 7 adapted to travel vertically on a tower 8, is movable vertically relative to the table top 2, the shutters 3, and the X-ray tube 1. A counterweight means 9, vertically guided and restrained against rotary movement by rollers 10 cooperating with webs 13 on such as an I-beam column 14 of tower 8, is connected to the carriage means 7 via a cable 15 and tower-supported pulleys 16 to counterbalance the weight of carriage means 7 and supported elements. An actuator wire 17 with anchored sheath 18, together with certain elements to be described hereinafter, constitutes the operative connection between the operator's shutter control handle 5 and shutters 3.

In accord with the invention, a compensating means is incorporated in the X-ray apparatus to assure that the dimension of the area of the X-ray beam 4 intercepted by the image producing member 6 is automatically held to a preselected size as determined by the operator's collimator control member, irrespective of component position changes tending to alter such size.

In the form of apparatus shown on the drawings, where movement of the image producing means 6 is exemplified, such movement tends to cause a variation in the dimension of the area of the X-ray beam 4 intercepted by such means 6 when raised and lowered relative to table top 2, shutters 3, and tube 1. This is evidenced by the showing in FIG. 1, where the image producing means 6 has been shown in phantom outline in a lowered position relative to an unaltered size of the beam 4, and it can be seen that the width dimension of the beam area intercepted by the image producing means 6 would be less than that intercepted in the upper position, for example.

In the apparatus exemplified, the compensating means takes the form of a means for automatically adjusting the beam size according to vertical position of the image producing member 6. In this form, such compensating means comprises linkage means 20 interposed between the output end of the actuator wire 17 and the X-ray shutters 3, together with cam means 21 responsive to vertical movement of the image producing member 6 to effect an adjustment of the shutters 3 via linkage means 20.

The exemplified linkage means 20 comprises an output element 22 which is operatively connected to one of the shutters 3 via a pin 23 and is slidably guided for movement transversely of such shutter to cause corresponding movement thereof; the two shutters being connected in a conventional manner via such as a cable-and-pulley arrangement 24 whereby movement of one shutter causes a corresponding opposite movement of the other and a dimension of the X-ray beam-defining aperture 25 is thereby adjusted.

Provision is made for the connecting element 22 to be actuated for shutter movement by the shutter control handle 5 and wire 17 through the medium of a lever 26 rockable about a fixed pivot pin 27 and operably connected by pin 28 to the input end of such connecting element 22.

An arrangement is made for the connecting element 22 to be actuated for shutter movement by provision of a cam slot 29 extending longitudinally of lever 26 and in which pin 28 is slidably movable, and provision of a longitudinal slot 30 in shutter 3 to enable pin 23 to slide therealong; whereby transverse movement of element 22 carries pin 28 along slot 29 and causes corresponding longitudinal movement of connecting element 22.

Transverse movement of connecting element 22 is arranged to be effected through the medium of a sleeve 31 through which the element 22 extends in slidable contact; sleeve 31 being attached to one end of a linearly-movable member 32 which is slidably guided at 33 for movement in the direction of extension of shutter slot 30 transversely of element 22.

The linearly-movable member 32 is arranged to be actuated by the cam 21 through the medium of a lever arm 34 operably connected for rotary movement in unison with the lowermost end of such cam, and operatively connected to such member 32 via a sliding pin joint 35.

The cam 21 extends vertically along the direction of travel of the vertical carriage means 7 and is supported at upper and lower ends for rotary movement by integral shaft portions 36, 37, respectively, journaled in portions 38, 39 of the tower 8. Such cam is of square cross-section having flat, outer, twisted cam surfaces extending axially therealong.

To cause rotary movement of cam 21 about its longitudinal axis for actuation of lever arm 34, such cam is operably connected by rollers 40 which contact the twisted cam surfaces on the cam 21 in a manner which enables longitudinal rolling movement of the rollers while imparting turning effort to the cam.

The rollers 40 are arranged to be advanced along the cam 21 to effect turning thereof in accord with the vertical position of the image producing member 6, through the medium of the counterweight 9. Arms 41 (one of which is shown) attached to the counterweight 9 carry the rollers 40 to different vertical positions which correspond to those of the member 6, and such counterweight is restrained against turning movement by the attached rollers 10 in rolling engagement with flat surfaces 43 of the webs 13 of the I-beam column 14.

Operation

In operation of the X-ray apparatus embodying the invention, assume initially that the several parts of such apparatus are in the respective positions in which they are shown in the drawings. The size of the image to appear on the image producing member 6 as a function of the width of the beam 4 intercepted by such member 6 may be varied as desired by manipulation of the shutter control handle 5, while the vertical carriage means 7 is allowed to remain stationary.

Such manipulation of the shutter control handle 5 will slide the actuator wire 17 relative to its sheath 18 in one or the opposite direction according to the direction of movement of such handle. This movement of the wire 17 will cause rocking movement of the lever 26 about the pin 27, and through contact of pin 28 with the side walls of the cam slot 29 of lever 26, such rocking movement of lever 26 will cause longitudinal movement of the connecting element 22 within the sleeve 31 attached to member 32 and cause actuation of the shutters 3 in a direction which causes the width of the beam-defining aperture 25 to either increase or decrease, according to the direction of shutter control handle movement.

Accordingly, the width of the beam 4 will increase or decrease, as the case may be, with a resultant increase or decrease in the width of the cross-sectional area of the X-ray beam intercepted by the image producing member 6, hence the width of the image produced thereby.

Only a single pair of shutters 3, together with its associated control handle 5, has been shown herein, but it will be understood that in accord with the usual practice, a second pair of shutters under the control of a respective operator's handle or under control of the same handle 5, will be employed to operate transversely of the direction of operation of the shutters 3 to control the opposite or length dimension, for example, of the X-ray beam.

It will be appreciated by reference to the showing in FIG. 2, for example, that such adjustment of the shutters 3 to control the width of the X-ray beam 4 by manipulation of the shutter control handle 5 may be effected irrespective of the position of connecting element 22 and its pins 23 and 28 along slots 29 and 30 in the lever 26 and shutter 3.

In accord with the prime feature of the present invention, the adjusted position of the handle 5 will correspond to a particular dimension of the X-ray beam 4 as intercepted by the image producing member 6 irrespective of the position of such member 6 above the table top 2, and this dimension is maintained constant for a selected position of handle 5 automatically during raising and lowering of the vertical carriage 7.

Assume now, that the shutter control handle 5 has been positioned to establish a corresponding adjustment of the shutters 3 to obtain a certain width of the X-ray beam 4 for a desired dimension of such beam as intercepted by the image producing member 6. Assume also that, having selected such dimension, it is desired to move such image producing member 6 toward or away from the object 44 being examined on the table top 2. The carriage means 7 will be raised or lowered, as the case may be, vertically along the column 8, while the counterbalance 9 moves correspondingly in the opposite direction.

Such vertical movement of the counterbalance 9 during vertical movement of the carriage means 7 will cause the cam 21 to turn about its longitudinal axis due to contact by the rollers 40 rolling longitudinally along the twisted outer surfaces of such cam, and the restraint against turning movement imposed on counterweights by the rollers 10 in rolling contact with the flat surfaces 43 of webs 13 on the I-beam column 14.

Turning movement of the cam 21 relative to the degree of vertical movement of the counterweight 9, hence vertical movement of carriage means 7, is determined by the nature and degree of twist imparted to the outer surfaces of such cam.

Such turning movement of cam 21, FIG. 2, will cause turning movement of the lever arm 34 about the axis of such cam to cause, through the medium of pin 35, linear movement of the member 32 as slidably guided at 33 and thereby adjust the transverse position of connecting element 22 by repositioning of the sleeve 31 through which such element extends slidably.

Such transverse movement of the connecting element 22 will cause the pins 23 and 28 to slide along the grooves 30 and 29, respectively, thereby causing the shutters 3 to move toward or away from one another, as the case may be, according to the direction of movement of member 32.

It will be appreciated, however, that such movement of the shutters, to follow movement of the pin 28 along the slot 29, will occur so long as the lever 26 extends in a direction other than at right angles to the direction of extension of connecting element 22. When such lever 26 is positioned at right angles to the connecting element 22, slots 29 and 30 will be parallel and the shutters 3 will be fully closed, so that no adjustment is required.

During such positioning of the shutters 3 with movement of connecting element 22 transversely of its longitudinal dimension correspondingly with vertical movement of the image producing member 6, the lever 26 is maintained in angular position in accord with the position of shutter control handle 5 by virtue of a greater degree of frictional restraint imposed by friction between the wire 17 and the sheath 18 than that imposed by the friction of sliding movement of pins 28 and 32 in slots 29 and 30. The arrangement of the mechanism such that the slot 29 is oriented parallel to the slot 30 when the shutters 3 are fully closed prevents transverse movement of the connecting element 22 from rocking the lever 26 and disrupting position of the shutter control handle 5 through the medium of the wire 17.

As will be understood, in order to obtain the desired results of the invention, the kinematic characteristics of the linkage means 20 and the cam 21 are such that, in the particular form of the invention illustrated, the shutter means 3 will be adjusted automatically during repositioning of the image producing member 6 such that the width of the X-ray beam 4 as intercepted by such member 6 will remain constant at a preselected value as determined by position of the shutter control handle 5.

While the illustrative apparatus has been described in connection with adjustment of only one dimension of the X-ray beam 4, it will be understood that apparatus accomplishing a similar purpose will be associated with the usual second pair of X-ray shutters for controlling the other dimension of the X-ray beam, which normally is of rectangular or square shape in cross-section.

It will also be understood that the invention as described herein is not necessarily limited to the particular case described where the image producing member 6 is moved vertically relative to the table top 2, since, in the usual case, the illustrated apparatus is usually provided with means whereby such apparatus may be tilted to a position in which the table top extends vertically, the tower 2 extends horizontally and the image producing member 6 is moved horizontally toward and away from the vertically extending table top.

Furthermore, it should be understood that the invention is not necessarily limited in its application with respect to movement of the image producing member 6 relative to the table top, since in certain instances it may be desirable to employ the teachings of the invention in conjunction with cases where the X-ray tube 1 is moved toward and away from the table top 2, while the image producing member 6 may be allowed to remain fixed.

Still further, it should be appreciated that X-ray apparatus employing the teachings of the present invention might employ other means than means for automatically adjusting the X-ray shutter opening to automatically maintain a selected dimension of the X-ray beam as intercepted by the image producing member during movement of such member relative to the X-ray table top, for example. A collimator having a fixed beam-defining aperture might be employed which is automatically positioned toward and away from the X-ray tube 1 to obtain the desired compensation.

It will be understood that the invention should not be construed necessarily in conjunction with the specific embodiment illustrated and described herein, except as defined by the following claims.

We claim as our invention:

1. X-ray apparatus comprising an X-ray table top for support of an object undergoing X-ray examination, an X-ray source beneath said table top, collimator means adjustable for varying the size of an aperture defining and directing an X-ray beam from said source through said table top, a tower extending above said table top, an image producing member vertically movable along said tower and extending over said table top in the path of said X-ray beam, an operator's control element mounted adjacent to said image producing member and having positions corresponding to desired dimensions of the X-ray beam as intercepted by said image producing member, a sheathed push-pull wire extending from said operator's control element and along said tower to the vicinity of said adjustable collimator means, automatic control means responsive to vertical movement of said image producing member along said tower, and linkage means operatively connected to said collimator means and operably connected to both said push-pull wire and to said automatic control means to maintain the size of said beam as intercepted by said image producing member constant in accord with preselected positions of said operator's control element irrespective of movement of said image producing member different distances away from said X-ray source.

2. X-ray apparatus comprising an X-ray table having a top for support of an object undergoing X-ray examination; an X-ray source beneath said table top; collimator means beneath said table top adjustable for varying the size of an aperture defining an X-ray beam projected upwardly from said source through said table top; a tower extending vertically above said table top; carriage means movable vertically on said tower, said carriage means having a horizontally-projecting portion extending over said table top; an image producing member carried by the aforesaid horizontally-projecting portion of said carriage means and disposed to intercept said X-ray beam; an operator's control handle disposed on the aforesaid horizontally-projecting portion of said carriage means; counterweight means guided for vertical movement along said tower and connected to said carriage means for corresponding movement with vertical movement thereof; vertical cam means on said tower operable by said counterweight means during vertical movement of same in coincidence with said carriage means, hence with said image producing member; and connecting means operatively connecting said operator's handle to said collimator means for adjusting the size of its aperture, said connecting means including a sheathed push-pull wire extending along the aforesaid horizontally-projecting portion of said carriage means and downwardly along said tower to the underside of said table top, and a linkage constructed and arranged to provide independent operative connections of said wire and of said vertical cam means to said collimator means.

References Cited in the file of this patent

UNITED STATES PATENTS

| 1,117,266 | Snook et al. | Nov. 17, 1914 |
| 1,767,756 | Hall | June 24, 1930 |
| 2,412,662 | Watson | Dec. 17, 1946 |
| 2,552,858 | Mueller et al. | May 15, 1951 |
| 2,567,363 | Blatz | Sept. 11, 1951 |

FOREIGN PATENTS

| 334,818 | Great Britain | Sept. 11, 1930 |